United States Patent [19]

deGaravilla

[11] Patent Number: 5,037,875

[45] Date of Patent: Aug. 6, 1991

[54] ANTISTATIC POLYMER BLEND

[75] Inventor: James R. deGaravilla, Silsbee, Tex.

[73] Assignee: E. I. du Pont de Nemours and Company, Wilmington, Del.

[21] Appl. No.: 636,921

[22] Filed: Jan. 2, 1991

[51] Int. Cl.$^5$ .............................................. C08K 5/36
[52] U.S. Cl. ................................... 524/317; 524/339; 524/910
[58] Field of Search ..................... 524/317, 339, 910

[56] References Cited

U.S. PATENT DOCUMENTS

| | | | |
|---|---|---|---|
| 4,053,540 | 10/1977 | Argurio et al. | 524/317 |
| 4,379,197 | 4/1983 | Cipriani et al. | 524/317 |
| 4,425,268 | 1/1984 | Cooper | 524/317 |
| 4,578,414 | 3/1986 | Sawyer et al. | 524/317 |

*Primary Examiner*—Paul R. Michl
*Assistant Examiner*—Tae H. Yoon

[57] ABSTRACT

The dissipation of static electricity from film of ethylene/carboxylic acid copolymer is improved by the incorporation of a combination of antistatic compounds therein, viz sorbitan monooleate and certain alkyl phenol poly(ethylene oxides).

9 Claims, No Drawings

5,037,875

ANTISTATIC POLYMER BLEND

BACKGROUND OF THE INVENTION

1. Field of the Invention

This invention relates to the use of a particular combination of antistatic compounds to produce synergism in the dissipation of static electricity from a polymer host for the compounds.

2. Description of Related Art

Polymer films in the course of their handling during manufacture can develop high charges of static electricity which can have harmful consequences ranging from sparking, possibly causing fires, to adhering to oppositely charged surfaces to interfere with use of the film in packaging operations. For example, film used to package food may be more advantageously handled in the packaging operation if the film is not attracted to the food. Film attraction for the food can prevent the desired wrinkle-free packaging of the food by the film.

A wide variety of antistatic compounds are available for incorporation into polymer films for reducing static electricity charges of the film, with varying efficacy depending on the polymer and the antistatic compound and the amount of compound that can be tolerated by the film before suffering loss of other desired properties. A publication of ICI Specialty Chemicals entitled "ATMER ® Antistatic Agent for Thermoplastic Polymer Applications" (11/87) discloses a large number of antistatic compounds.

In the case of film of ethylene/carboxylic acid copolymer which may be partially neutralized to form ionomer, improvement in its antistatic performance is desired. Heretofore, there has not been a commercially viable antistatic additive for incorporation into this acid polymer in film form.

SUMMARY OF THE INVENTION

The present invention involves the discovery that the incorporation of a certain combination of antistatic compounds in film of the acid copolymer provides improved dissipation of static electricity.

More particularly, the present invention is a blend capable of being melt fabricated into an antistatic film comprising copolymer of ethylene with an alpha, beta-ethylenically unsaturated carboxylic acid having from 3 to 8 carbon atoms, said copolymer having 0 to 90% of the carboxylic acid groups neutralized by metal ions, and an antistatic effective amount of the combination of the compounds sorbitan monooleate and alkyl phenol poly(ethylene oxide) wherein the alkyl group contains from 8 to 10 carbon atoms and the number of ethylene oxide units is from 0 to 16.

Film which is melt fabricated from this blend has superior antistatic properties as compared to film made using either of the antistatic compounds by itself in the copolymer in an amount equal to the total amount of the combination of compounds used in accordance with the present invention.

DETAILED DESCRIPTION OF THE INVENTION

The copolymer used in the present invention is either the acid copolymer or the ionomer obtained therefrom. Description of the preparation of these copolymers and the melt fabrication of film therefrom is provided in U.S. Pat. Nos. 4,248,990, 3,264,272, and 4,351,931. The copolymer can be random or non-random, but random is preferred. Preferred unsaturated acids contain 3 to 8 carbon atoms and include acrylic acid, methacrylic acid, and itaconic acid. Preferably the copolymer contains 5 to 50% of the acid co-monomer based on the weight of the copolymer, and more preferably from 5 to 20 weight percent. The melt index of the copolymer is preferably less than 30 g/10 min. and more preferably less than 20 g/10 min.

In the case of ionomer obtained from these acid copolymers, the preferred metal ions for neutralizing the acid groups are $Na^+$, $K^+$, $Li^+$, $Mg^{+2}$, $Ca^{+2}$ and $Zn^{+2}$. The preferred neutralization is about 10 to 90%, more preferably 15 to 50% of the acid groups present in the copolymer.

The antistatic compounds used in combination in the present invention are available from ICI as ATMER 105 in the case of the sorbitan monooleate. A more specific monooleate useful in the present invention is sorbitan mono-9-octadecenoate. In the case of the alkyl phenol compound, this is available from ICI as ATMER 508 and from Rohm & Haas as Triton N-101. Examples of alkyl phenol compounds include nonyl phenol substituted with an ethylene oxide adduct containing 0 to 11 ethylene oxide units, decyl phenol substituted with an ethylene oxide adduct containing 2 to 7 ethylene oxide units and mixture thereof. Another example is octyl phenol with an ethylene oxide adduct containing 1 to 16 ethylene oxide units. Preferably, the alkyl and poly(ethylene oxide) adduct are para-substituted on the phenol moiety.

The antistatic compounds are uniformly incorporated into the copolymer by conventional melt blending techniques, e.g., the compounds are blended with molten copolymer in a manner to form a homogeneous blend, using for example an extruder. The compounds can be fed to the extruder along with the copolymer feed or can be metered into the copolymer as it advances as a melt along the extruder barrel. The resultant blend can be extruded and cut into molding granules for subsequent melt fabrication into antistatic film or can be directly fabricated into the film. Alternatively, the antistatic compounds can be melt blended with the copolymer to form a concentrate of the antistatic compounds for subsequent blending with the copolymer used in the present invention. In the concentrate approach, the polymer of the concentrate may be the same as the copolymer used in the subsequent blend or can be a different polymer which, however, is miscible with the copolymer upon melt blending.

The total amount of antistatic compounds present in the ultimate blend used for making the antistatic film is about 0.75 to 2.5% based on the weight of the copolymer plus the weight of the compounds, and preferably about 1.0 to 2.0 % by weight.

Surprisingly, when both these antistatic compounds are present, the antistatic result is better than when these antistatic compounds are used by themselves in the same amount as the total amount of the combination of the compounds. The combination of antistatic compounds used in accordance with the present invention gives better antistatic results than other antistatic compounds used in the same total amount as well. It is desired to minimize the amount of antistatic compound used for reasons of economy and to avoid any deleterious effect on the film product, so the possibility of adding increased amounts of antistatic compounds on an individual basis to the copolymer is not a viable alternative.

Preferably, the proportion of antistatic compound to the combination thereof will range from (i) 1 part of one of the compounds to 3 parts of the other compound to (ii) 3 parts of the first mentioned compound to 1 part of the other compound, all parts being by weight. More preferably, the combination of antistatic compounds will be 40 to 60 weight percent of one compound and 60 to 40 weight percent of the other, to total 100% of the combination. For both convenience and effectiveness, the combination can consist of about equal weight proportions of each compound.

The blends of the present invention can be melt fabricated into film by conventional methods. The film can be unsupported or it can be supported as in the case forming a coating on a substrate. In the case of supported film, this can be made by such conventional methods such as extrusion coating and co-extrusion. The resultant film, whether supported or unsupported will generally have a thickness of about 0.2 to 2 mils (0.005 to 0.05 mm). Examples of substrates for supporting the film of the present invention include paper, foil, and other polyolefins.

The film is especially useful for wrapping articles which themselves present a static charge that would otherwise attract an oppositely static charged wrapping film, but is generally useful for wrapping articles. One particularly annoying problem solved by the film of the present invention is that the film will not attract oppositely charged food particles to the seal area of the film package.

The improved antistatic performance of film of the present invention is manifested by the rate at which the static charge in the film dissipates. In the Examples, this performance is tested by the static decay test wherein film samples are stored under controlled temperature and humidity conditions in an air atmosphere, and these samples are removed periodically for test. The test consists of imposing a high static charge on the film (in air at room temperature) and measuring the time required for the static charge to fall to a given lower level.

The dissipation of the static charge by the film is believed to involve a surface phenomenon, wherein the antistatic compound(s) over a period of time after film manufacture exude to the film surface to cause dissipation of the static charge. This phenomenon takes time, in the sense that freshly made film takes longer to dissipate the static charge than aged film. The improved static dissipation performance of film of the present invention takes the form of this dissipation occurring faster within the early period after film manufacture. For example, film of the present invention stored in air at 70° C. and 50% relative humidity, preferably dissipates a static charge of 5000 volts to just 500 volts in less than 3 seconds at about 12 days after film manufacture, and less than 2 seconds at about 20 days after film manufacture. Preferably, this static decay occurs in less than 2 seconds at about 14 days and even more preferably in less than 1 second at about 14 days after film manufacture.

Examples of the present invention, in which parts and percents are by weight unless otherwise indicated, are presented hereinafter.

EXAMPLES

In these Examples, the antistat compositions are prepared unless otherwise indicated by blending the antistatic compound(s) with ethylene/methacrylic acid copolymer (9 weight percent methacrylic acid, M.I.=2–3 g/10 min.) in a Banbury mill. The mill is operated at 150° C. to thoroughly melt the copolymer and then the antistat is fed slowly into the copolymer melt, and the operation of the Banbury is continued for about 10 min. to get uniform incorporation of the antistatic compound into the copolymer. The resultant blend is pelletized and the pellets are dried under a nitrogen atmosphere overnight. The amount of the antistatic compound(s) present in the blend is 10% by weight, whereby the blend is used as a concentrate for incorporation into additional copolymer for fabrication into film.

Film is made by adding the concentrate pellets to the copolymer desired in an extruder in an amount to produce the proportions of antistatic compound desired in the copolymer, and the extruder extrudes a film tubing in which the film thickness is about 2 mil (0.05 mm). Film samples for testing in the static decay test are cut from this film. The film samples are conditioned and stored at 70° C. (plus or minus 2° C.) and 50% relative humidity for at least 48 hours before static decay testing, but this conditioning and storage is continuous for the life of the film aging period during which time, film samples are removed from storage for static charging to 5000 volts d.c. and the testing of static decay.

The antistatic compounds tested were as follows:

| Code | Antistat Compound |
| --- | --- |
| A. | Sorbitan monooleate (ATMER ® 105) |
| B. | Nonyl phenol-p-poly(ethylene oxide)$_{0-11}$ containing a minor proportion of decyl-phenol-p (polyethylene oxide)$_{1-11}$ (ATMER ® 508) |
| C. | Glycerol fatty acid ester (ATMER ® 184) |

EXAMPLE 1

In this Example, the copolymer added to the concentrate described above to form the film was ionomer formed from a copolymer of ethylene with 15% by weight of methacrylic acid (MI=14 g/10 minutes) an 22% neutralized by Zn ion. The resultant film compositions consisted of 13.5 weight % of the acid copolymer, 85 weight % of the ionomer and 1.5 weight % of the antistatic compound identified in Table I.

Table I shows the time in Sec. for the 5000 volt d.c. charge imposed on the film to dissipate to only 500 volts d.c. at various film ages from the time of manufacture of the film. Samples of film were taken from the conditioning/storage area for each test and then returned to this area for further aging until the next test.

TABLE I

| | Film Composition | | | |
| --- | --- | --- | --- | --- |
| Film Age (Days) | (a) 1.5% Antistat A Static[1] Decay (Sec.) | (b) 1.5% Antistat B Static Decay (Sec.) | (c) 1.5% Antistat C Static Decay (Sec.) | (d) 0.75% Antistat A 0.75% Antistat B Static Decay (Sec.) |
| 7 | 8.77 | —[2] | 24.26 | 4.05 |
| 12 | 14.53 | 35.16 | 17.15 | 2.94 |
| 20 | 11.75 | 20.08 | 9.36 | 1.74 |
| 26 | 10.10 | 5.06 | 5.58 | 1.28 |
| 33 | 9.21 | 0.88 | 4.32 | 1.10 |
| 40 | 8.62 | 1.64 | 3.32 | 1.06 |

TABLE I-continued

| | | | | |
|---|---|---|---|---|
| 47 | 7.71 | 1.07 | 2.10 | 0.91 |

[1] The film age for this composition was 8, 14, 21, 27, 34, 41, and 48 days, respectively.
[2] The static decay for this film composition at this age, could not be measured because the film could not be fully charged to 5000 v.d.c., indicating poor antistat capability.

Film (d) represents the present invention. This film shows a rapid decay after only one week after film manufacture, and by about three weeks after film manufacture, the electrostatic charge on the film decays within two seconds.

By way of comparison, films (a) and (c) exhibited much longer decay time at the one week interval (film (b) was even more deficient), and at about the three week interval, the minimum decay time for these films was greater than nine seconds, or more than 4× longer than for film (d) of the present invention. The film aging times used for film (a) were in fact one day longer than shown in Table I, indicating that antistat A by itself is even a poorer antistat in ionomer than suggested by Table I, because the decay values shown for film (a) in the Table were measured after giving the film one day longer for static decay than shown in the Table.

As the films age, the time for static decay falls to a low level for all the films (except film (a)). Film (d) has the advantage over films (a)–(c), however, by much quicker static decay in the period up to about 4 weeks, so that the film can be used in packaging much sooner after manufacture than films (a)–(c), with the result of substantially diminished static electricity problem from such early use.

Table II shows additional film compositions for purposes of comparison to the static decay results shown for film (d) of the present invention. The film compositions are the same as for films (a) and (d), except for the identity of the antistatic additive, which is shown in Table II.

TABLE II

| | Film Composition | | |
|---|---|---|---|
| Film Age (Days) | (e) 0.75% A 0.75% C Static Decay (Sec.) | (f) 0.75% B 0.75% C Static Decay (Sec.) | (g) 0.50% A 0.50% B 0.50% C Static Decay (Sec.) |
| 9 | 13.16 | 105.66 | 10.37 |
| 14 | 10.83 | 20.75 | 4.43 |
| 21 | 6.19 | 6.60 | 2.45 |
| 27 | 5.50 | 3.01 | 2.49 |
| 34 | 4.53 | 1.66 | 1.72 |

Films (f) and (g) were tested on a slightly delayed schedule as compared to the schedule for film (d); film (e) was tested on about the same schedule as film (d) (7, 12, 21, 26, and 34 days respectively). The delayed testing schedule for films (f) and (g) gave them the opportunity to show improved static decay (shorter decay times) and yet film (d) exhibits better results.

From Table I and II it can be seen that combinations of antistat compounds can give poorer results than obtained from the antistat compounds used by themselves. Thus, the combination of compounds B and C in the film (film (c)) give poorer results than when compounds B and C are used separately (films (b) and (c), respectively). The combination of compound C with compounds A and B (film (g)) gives a poorer result than when just compounds A and B are combined (film (d)).

EXAMPLE 2

The procedure of Example 1 was followed to make and test the film compositions described in Table III. The composition of films (h)–(j) consisted of 18 weight % of the acid copolymer and 80 weight % of the ionomer described hereinbefore and 2 weight % of the antistatic additive identified in Table III.

TABLE III

| (h) 2.0% Antistat A | | (i) 2.0% Antistat B | | (j) 1% Antistat A 1% Antistat B | |
|---|---|---|---|---|---|
| Film Age (Days) | Static Decay (Sec.) | Film Age (Days) | Static Decay (Sec.) | Film Age (Days) | Static Decay (Sec.) |
| 9 | 21.19 | 10 | 16.88 | 7 | 1.72 |
| 14 | 11.39 | 15 | 6.08 | 13 | 0.95 |
| 21 | 9.62 | 22 | 0.94 | 20 | 0.72 |
| 27 | 10.43 | 29 | 0.44 | 26 | 0.72 |
| 34 | 8.31 | 35 | 0.26 | 33 | 0.70 |
| 41 | 6.63 | 40 | 0.21 | 40 | 0.57 |
| 48 | 5.31 | 47 | 0.17 | 47 | 0.50 |

These results show the effects of higher levels of antistat compound(s) in the film with film (j) of the present invention exhibiting superior results for at least about the first two weeks after film manufacture.

EXAMPLE 3

The procedure of Example 1 was followed to make the film compositions described in Table IV, using the same acid copolymer component described hereinbefore and the ionomer was ethylene/(15 weight percent) methacrylic acid copolymer neutralized 23% with Zn ion and having a M.I. of 5 g/10 minutes. The film consisted of 13.5 weight % of the acid copolymer, 85 weight % of the ionomer and 1.5 weight % of the antistat additive identified in Table IV.

TABLE IV

| | Film Composition | | | | |
|---|---|---|---|---|---|
| (k) 1.5% Antistat A | | (l) 1.5% Antistat B | | (m) 0.75% A 0.75% B | |
| Film Age (Days) | Static Decay (Sec.) | Film Age (Days) | Static Decay (Sec.) | Film Age (Days) | Static Decay (Sec.) |
| 8 | 36.78 | 8 | 72.00 | 11 | 2.51 |
| 13 | 22.46 | 13 | 82.83 | 14 | 1.57 |
| 20 | 15.25 | 21 | 4.39 | 21 | 1.08 |
| 26 | 17.84 | 28 | 2.00 | 28 | 1.13 |
| 33 | 12.25 | 33 | 1.12 | 34 | 0.84 |
| 40 | 11.12 | 40 | 0.77 | 41 | 0.73 |
| 47 | 9.90 | 47 | 0.50 | 48 | 0.71 |

Film (m) is a film of the present invention and exhibited much faster decay of static electricity for about the first four weeks after film manufacture than either films (k) and (l) which used the antistatic compounds by themselves.

When this Example was repeated, but using 1.5% of antistatic compound C by itself, the time for stress decay over the period of 7 to 47 days from 64.13 to 2.36 Sec.

When this Example was repeated but increasing the level of antistatic compound A by itself to 2.0% and antistatic compound B by itself to 2.0%, the static decay ranged from 25.40 Sec. to 9.04 Sec. for film containing compound A over the period of 7 to 47 days of film aging. For the film containing antistatic compound B by itself, the static decay results were as follows:

| Film Age (Days) | Static Decay (Sec.) |
| --- | --- |
| 7 | 62.41 |
| 14 | 10.73 |
| 21 | 2.74 |
| 28 | 1.25 |
| 33 | 0.65 |
| 41 | 0.42 |

By way of comparison, film of the present invention prepared by repetition of this Example, but containing the combination of 1% antistatic compound A and 1% antistatic compound B exhibited the following static decay results:

| Film Age (Days) | Static Decay (Sec.) |
| --- | --- |
| 10 | 1.10 |
| 14 | 0.75 |
| 21 | 0.50 |
| 28 | 0.48 |
| 33 | 0.31 |
| 41 | 0.31 |

The combination of antistatic compounds in this film gave much better static discharge performance for at least the first four weeks after film manufacture as compared to the films described in the preceding paragraph.

As many widely different embodiments of this invention may be made without departing from the spirit and scope thereof, it is to be understood that this invention is not limited to the specific embodiments thereof except as defined in the appended claims.

What is claimed is:

1. A blend capable of being melt fabricated into an antistatic film comprising copolymer of ethylene with an alpha, beta-ethylenically unsaturated carboxylic acid having from 3 to 8 carbon atoms, said copolymer having 0 to 90% of the carboxylic acid groups neutralized by metal ions, and an antistatic effective amount of the combination of the compounds sorbitan monooleate and alkyl phenol poly(ethylene oxide) wherein the alkyl group contains from 8 to 10 carbon atoms and the number of ethylene oxide units is from 0 to 16.

2. The blend of claim 1 wherein the total amount of the antistatic compounds is about 0.75 to 2.5% based on the weight of the copolymer plus the compounds.

3. The blend of claim 2 wherein the weight ratio of said monooleate to said alkyl phenol is about 3:1 to 1:3 parts by weight.

4. The blend of claim 1 wherein said copolymer is ionomer.

5. The blend of claim 1 melt fabricated into the form of a film.

6. The film of claim 5 wherein said film is unsupported.

7. The film of claim 5 wherein said film is supported.

8. The film of claim 5 having a static decay from 5000 volts to 500 volts in less than three seconds at about 12 days after film manufacture and storage at 70° C. and 50% relative humidity in air.

9. The film of claim 5 wherein the static decay occurs in less than two seconds at about 14 days after said manufacture and storage.

* * * * *